(12) United States Patent
Cartwright et al.

(10) Patent No.: US 11,345,396 B2
(45) Date of Patent: May 31, 2022

(54) MODULAR POWER STEERING APPARATUS

(71) Applicant: ZF ACTIVE SAFETY AND ELECTRONICS US LLC, Livonia, MI (US)

(72) Inventors: Mark A. Cartwright, West Lafayette, IN (US); Ryan L. Noerenberg, West Lafayette, IN (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 128 days.

(21) Appl. No.: 16/792,916

(22) Filed: Feb. 18, 2020

(65) Prior Publication Data
US 2021/0253160 A1    Aug. 19, 2021

(51) Int. Cl.
*B62D 5/04*     (2006.01)
*B62D 1/20*     (2006.01)

(52) U.S. Cl.
CPC ............. *B62D 5/0409* (2013.01); *B62D 1/20* (2013.01); *B62D 5/0403* (2013.01)

(58) Field of Classification Search
CPC .. B62D 5/0403; B62D 5/0409; B62D 5/0412; B62D 1/20
See application file for complete search history.

(56) References Cited

U.S. PATENT DOCUMENTS

| | | | |
|---|---|---|---|
| 8,360,197 B2 | 1/2013 | Escobedo et al. | |
| 8,567,554 B2* | 10/2013 | Zaloga | B62D 5/0454 |
| | | | 180/446 |
| 2009/0294205 A1* | 12/2009 | Wilkes | F16H 57/021 |
| | | | 180/444 |
| 2012/0273292 A1* | 11/2012 | Sekine | B62D 5/0406 |
| | | | 180/444 |
| 2018/0154927 A1* | 6/2018 | Wilkes | B62D 5/04 |
| 2019/0283797 A1* | 9/2019 | Steck | B62D 5/0454 |
| 2021/0108705 A1* | 4/2021 | Palmer | F16H 55/22 |

FOREIGN PATENT DOCUMENTS

WO     2018081371     5/2018

* cited by examiner

*Primary Examiner* — Tony H Winner
(74) *Attorney, Agent, or Firm* — Tarolli, Sundheim, Covell & Tummino LLP (57) ABSTRACT

A modular power steering apparatus includes a rotatable shaft, which is selectively rotatable to effect turning movement of at least one vehicle wheel. A housing supports the rotatable shaft for rotation relative thereto, about a shaft axis. A first rotational input assembly is provided for transmitting a steering command from a steering member to the rotatable shaft. A second rotational input assembly is operatively connected with the rotatable shaft. The second rotational input assembly is configured to apply a rotational force to the rotatable shaft. The apparatus includes a plurality of drive stations. Each drive station is configured to selectively accept both of the first and second rotational input assemblies for operating connection to the rotatable shaft at different times.

20 Claims, 7 Drawing Sheets

MODULAR POWER STEERING APPARATUS

TECHNICAL FIELD

The present invention relates to an apparatus for use in turning steerable vehicle wheels and, more specifically, to a modular electric power steering device for use in turning steerable wheels of a vehicle, especially a commercial vehicle such as a heavy truck.

BACKGROUND

A known vehicle steering apparatus includes a steering member which is axially movable to effect turning movement of steerable vehicle wheels, particularly for a commercial vehicle such as a heavy truck. A pinion is disposed in meshing engagement with a rack portion of the steering member. A steering column interconnects the pinion and a vehicle steering wheel. A ball nut assembly is connected with an externally threaded portion of the steering member. A motor is connected with the ball nut assembly. The motor is operable to effect rotation of the ball nut assembly relative to the steering member to cause the steering member to move axially relative to the vehicle. Motion of the steering member is controlled by an input unit transmitting operator commands from a steering wheel or other operator input device. Example electric power vehicle steering apparatuses are disclosed in U.S. Pat. Nos. 8,567,554 and 8,360,197, both of which are incorporated by reference herein.

SUMMARY

In an aspect, a modular power steering apparatus is provided. A rotatable shaft is selectively rotatable to effect turning movement of at least one vehicle wheel. A housing supports the rotatable shaft for rotation relative thereto, about a shaft axis. A first rotational input assembly is provided for transmitting a steering command from a steering member to the rotatable shaft. A second rotational input assembly is operatively connected with the rotatable shaft. The second rotational input assembly is configured to apply a rotational force to the rotatable shaft. The apparatus includes a plurality of drive stations. Each drive station is configured to selectively accept both of the first and second rotational input assemblies for operating connection to the rotatable shaft at different times.

In an aspect, an apparatus for use in turning steerable vehicle wheels is provided. A rotatable shaft is selectively rotatable to effect turning movement of at least one vehicle wheel. A housing supports the rotatable shaft for rotation relative thereto, about a shaft axis. A steering member is manipulable by a vehicle operator to provide a steering command to the apparatus. A first rotational input assembly is provided for transmitting the steering command from the steering member to the rotatable shaft. A second rotational input assembly is operatively connected with the rotatable shaft. The second rotational input assembly is operable to apply a rotational force to the rotatable shaft. The apparatus includes a plurality of drive stations. Each drive station is configured to selectively accept both of the first and second rotational input assemblies for operating connection to the rotatable shaft at different times.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 1:
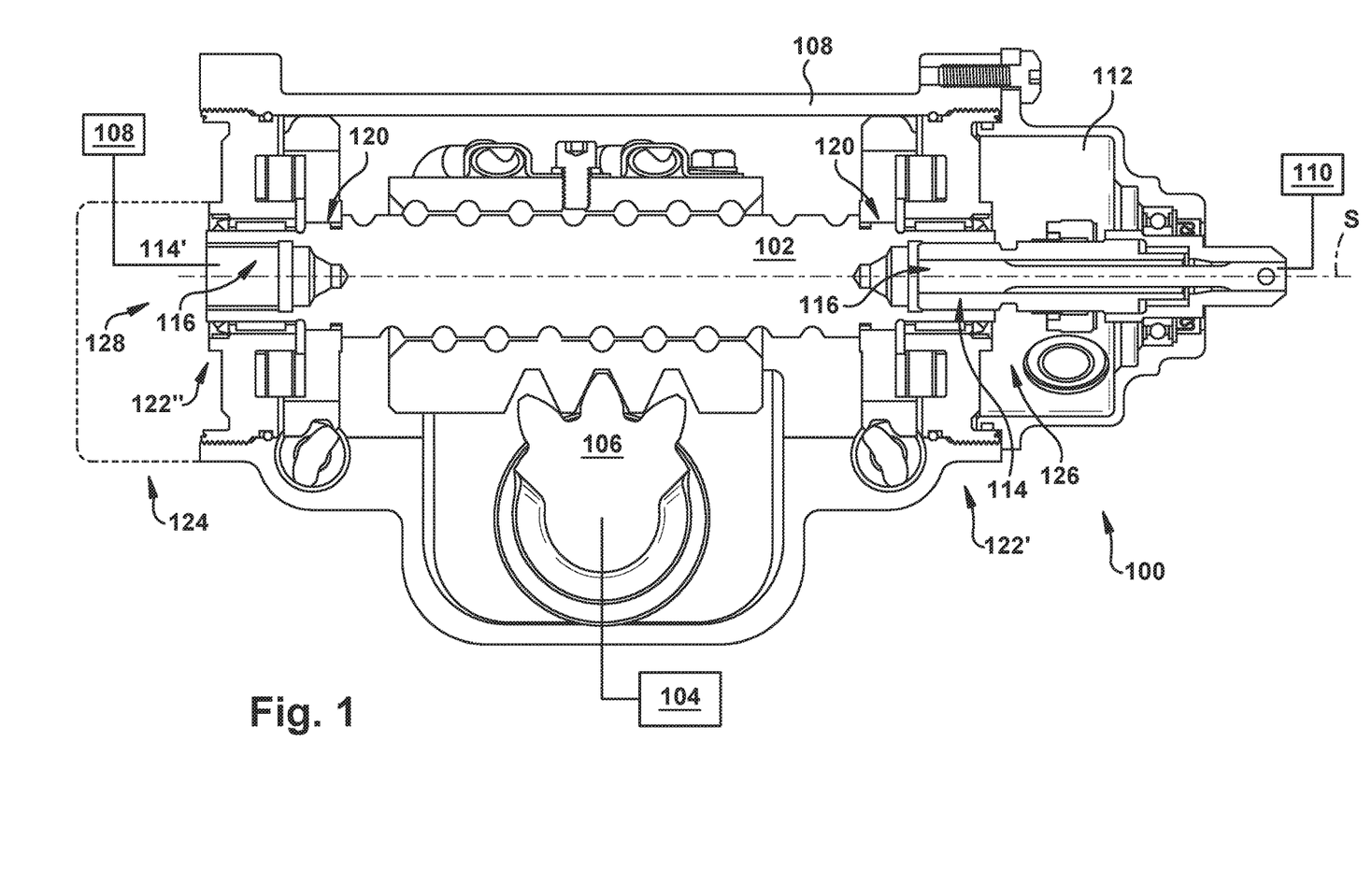
FIG. 1 is a schematic cross-sectional side view of an aspect of a modular electric power steering apparatus.

FIG. 1 depicts a modular power steering apparatus 100 for use in turning steerable vehicle wheels, including a rotatable shaft 102 that is selectively rotatable to effect turning movement of at least one vehicle wheel (shown schematically at 104). For example, the rotatable shaft 102 may drivingly interface with a sector gear 106 configured to turn the wheels in a known manner.

A housing 108 supports the rotatable shaft 102 for rotation of the rotatable shaft 102 about a shaft axis S, relative to the housing 108. A steering member (e.g., a steering wheel—shown schematically at 110 in FIG. 1) is manipulable by a vehicle operator to provide a steering command to the apparatus 100. The steering command may be transmitted from the steering member 110, or from any other steering command origination (e.g., an autonomous vehicle component), to the rotatable shaft 102 through the use of a first rotational input assembly 112. The first rotational input assembly 112 is shown in the Figures as being an input shaft module with a torque angle sensor, but one of ordinary skill in the art will be able to provide an appropriate first rotational input assembly 112. The first rotational input assembly 112 may include an input feature 114, as shown in the Figures, for attachment to the rotatable shaft 102 in any desired manner. For example, the depicted input feature 114 is an input shaft which can be inserted into an internal drive feature 116 in a male-female manner to achieve the desired connection A second rotational input assembly (shown schematically at 118 in FIG. 1 as an electronic power pack) may be operatively connected with the rotatable shaft 102. The second rotational input assembly 118 is configured to apply a rotational force to the rotatable shaft 102. Again, the second rotational input assembly 118 may include an input feature 114' for attachment to the rotatable shaft 102 in any desired manner. For example, the input feature 114' could be an input shaft which can be inserted into an internal drive feature 120. One of ordinary skill in the art can readily provide mechanical connections between the rotatable shaft 102 and each of the first and second rotational input assemblies 112 and 118 for a particular use environment of the present invention.

In the depicted example use environment, the first rotational input assembly 112 provides a small rotational force indicative of the direction and magnitude of the steering command. The second rotational input assembly 118 may provide steering assistance in response to the steering command-based rotational input from the first rotational input assembly 118 to a level which is mechanically sufficient to achieve the desired effect of moving the rotatable shaft 102 to move the sector gear 106 and thus turn the vehicle wheels 104. Different vehicle manufacturers have different desired physical configurations for the apparatus 100, depending on the volume and three-dimensional shape of the space available in the vehicle compartment area where the apparatus 100 is to be installed. For example, it may be desirable to have the first and second rotational input assemblies 112 and 118 both aligned along the shaft axis S for some vehicle types, while providing a second rotational input assembly 112 which is oriented perpendicularly to the shaft axis S may be desirable for other vehicle types. However, the manufacturer of the apparatus 100 would generally prefer to avoid having to create separate, custom apparatus 100 configurations for each vehicle use environment, to keep inventory, design, recordkeeping, and other manufacturing and stock costs down.

To address this configuration issue, the apparatus 100 includes a plurality of drive stations 122, with each drive station 122 being located in at least one of a different orientation and a different position from the other drive stations 122, relative to the rotatable shaft 102. Each drive station 122 is configured to selectively accept both of the first and second rotational input assemblies 112 and 118 for operating connection to the rotatable shaft 102 at different times. Stated differently, the apparatus 100 has a modular configuration, such that each of the first and second rotational input assemblies 112 and 118 could be operatively connected, via the drive stations 122 and associated components, to the rotatable shaft 102 in a variety of configurations. (It is contemplated, though, that only one of the first and second rotational input assemblies 112 and 118 will be attached to any one selected drive station 122 at any predetermined time.)

For example, when there are two drive stations 122 provided by an apparatus 100, the first rotational input assembly 112 could be operatively connected to a selected one of the two drive stations 122 concurrently with the second rotational input assembly 118 being operatively connected to the other of the two drive stations 122. As desired, the positions of the first and second rotational input assemblies 112 and 118 could be "swapped" or switched on the two available drive stations 122 in this two-station example, such as to provide a more desirable form factor for a different vehicle configuration. Summarized broadly, the first and second rotational input assemblies 112 and 118 are each configured for concurrent operative connection to different drive stations 122 of the rotatable shaft 102.

It is contemplated, though, that a particular apparatus 100 will be "set up" with the first and second rotational input assemblies 118 being located at predetermined drive stations when the apparatus 100 is assembled for use with a particular vehicle configuration, and that "set up" will not be changed during the lifetime of that particular apparatus 100. However, one of ordinary skill in the art will readily understand how, given the modular nature of the apparatus, a relatively modest inventory of spare apparatus 100 parts could be deployed in various configurations to serve the needs of a large range of vehicle types, either during original manufacture of the vehicle or during later repair or rehabilitation.

It is also contemplated that the housing 108 may include one or more removable covers (one shown in phantom line at 124 in FIG. 1). Each removable cover 124 is associated with at least one drive station 122. When present, the cover 124 is installed on a drive station 122 which is not concurrently accepting one of the first and second rotational input assemblies 112 and 118. Accordingly, more than two drive stations 122 could be provided to a particular apparatus 100 and the cover 124 can be used to "blank out" any drive station 122 not in use. In some instances, only one of a first or second rotational input assembly 112 or 118 could be provided to an apparatus 100, and a cover 124 could be associated, in that case, with all but one of the drive stations 122 of a particular apparatus 100.

The drive stations 122 may each include appropriate components to operatively interface, at different times, with both of the first and second rotational input assemblies 112 and 118. These may be the same components for both types of assemblies, or different components could be provided for each assembly type, with the unused components at any given time simply not being connected to a non-compatible assembly. It is contemplated, though, that one of ordinary skill in the art will provide drive stations 122 wherein the non-compatible components will not interfere mechanically with the compatible components then in use.

FIGS. 2A-4B illustrate several non-limiting example use configurations of the apparatus 100 of FIG. 1, with each use configuration being suitable for inclusion in a vehicle having a corresponding shape/volume available to receive the apparatus 100 of that use configuration, but potentially not the apparatuses 100 of other use configurations. Each of the use configurations of FIGS. 2A-4B include the same housing 108 (and corresponding internal components) and first and second rotational input assemblies 112 and 118, but the use configurations each assemble these components differently through the use of the drive stations 122. In the present description, the element number "122" is used to refer to one or more drive stations collectively and/or without distinction among them, while various combinations of "prime" marks are used to indicate a particular one of the drive stations, for clarity of description.

In the Figures, a first drive station 122' is located coaxially along the shaft axis S and directly adjacent a first end 126 (shown in FIG. 1) of the rotatable shaft 102. As previously noted, the first drive station 122' may include at least one of an internal and external drive feature 116 and 120 for operative connection to the first and/or second rotational input assemblies 112 and 118, or any other mechanical components to achieve the desired operational connection.

Similarly, a second drive station 122" is located coaxially along the shaft axis S and directly adjacent a second end 128 of the rotatable shaft 102. The second drive station 122" is oppositely facing and spaced apart from the first drive station 122'. Like any drive station 122 provided to the apparatus 100, the second drive station 122" may include at least one of an internal and external drive feature 116 and 120 for operative connection to the first and/or second rotational input assemblies 112 and 118, or any other mechanical components to achieve the desired operational connection.

Figure 2A:
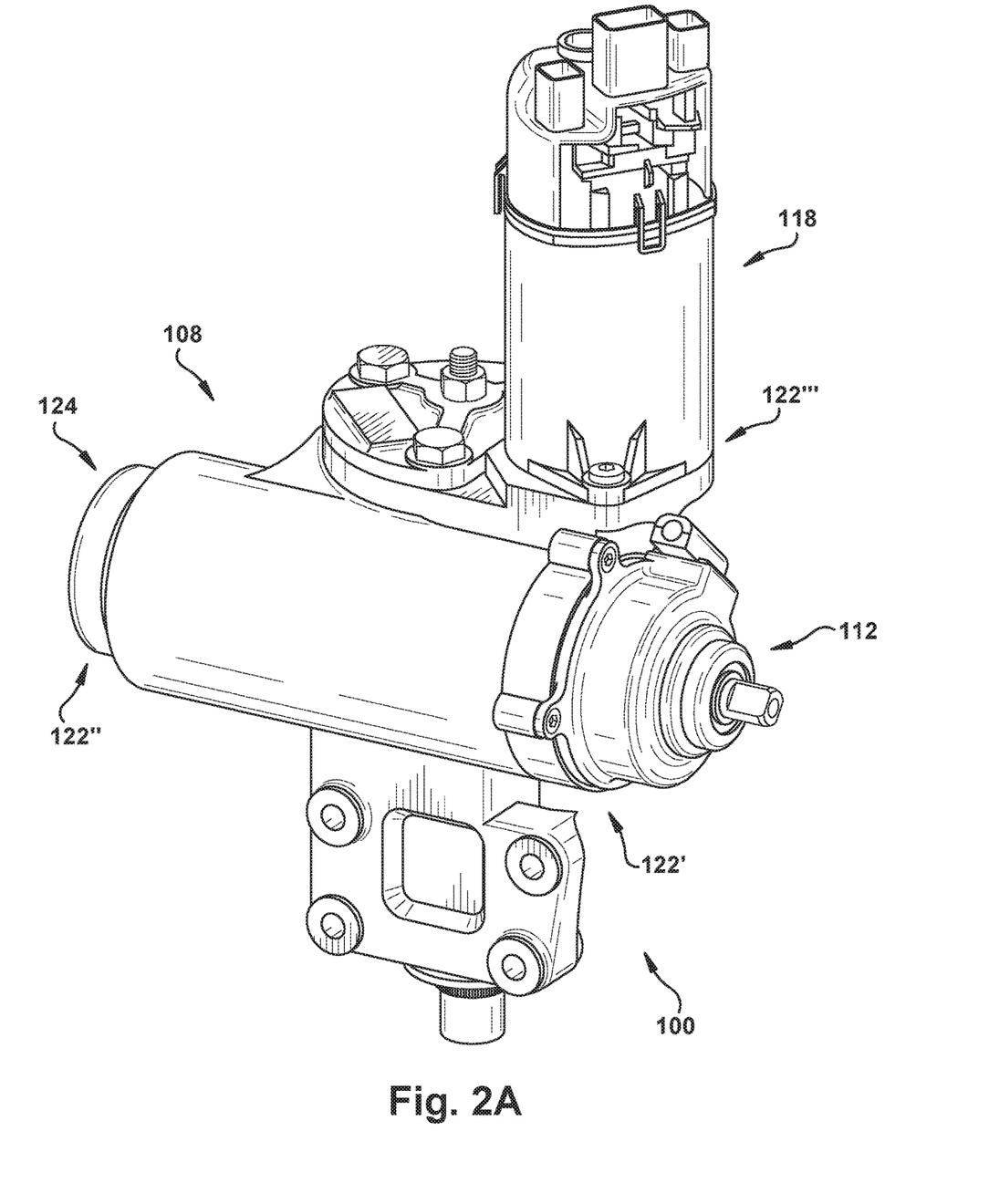
FIG. 2A is a perspective side view of the device of FIG. 1 in a first example use configuration.
Figure 2B:
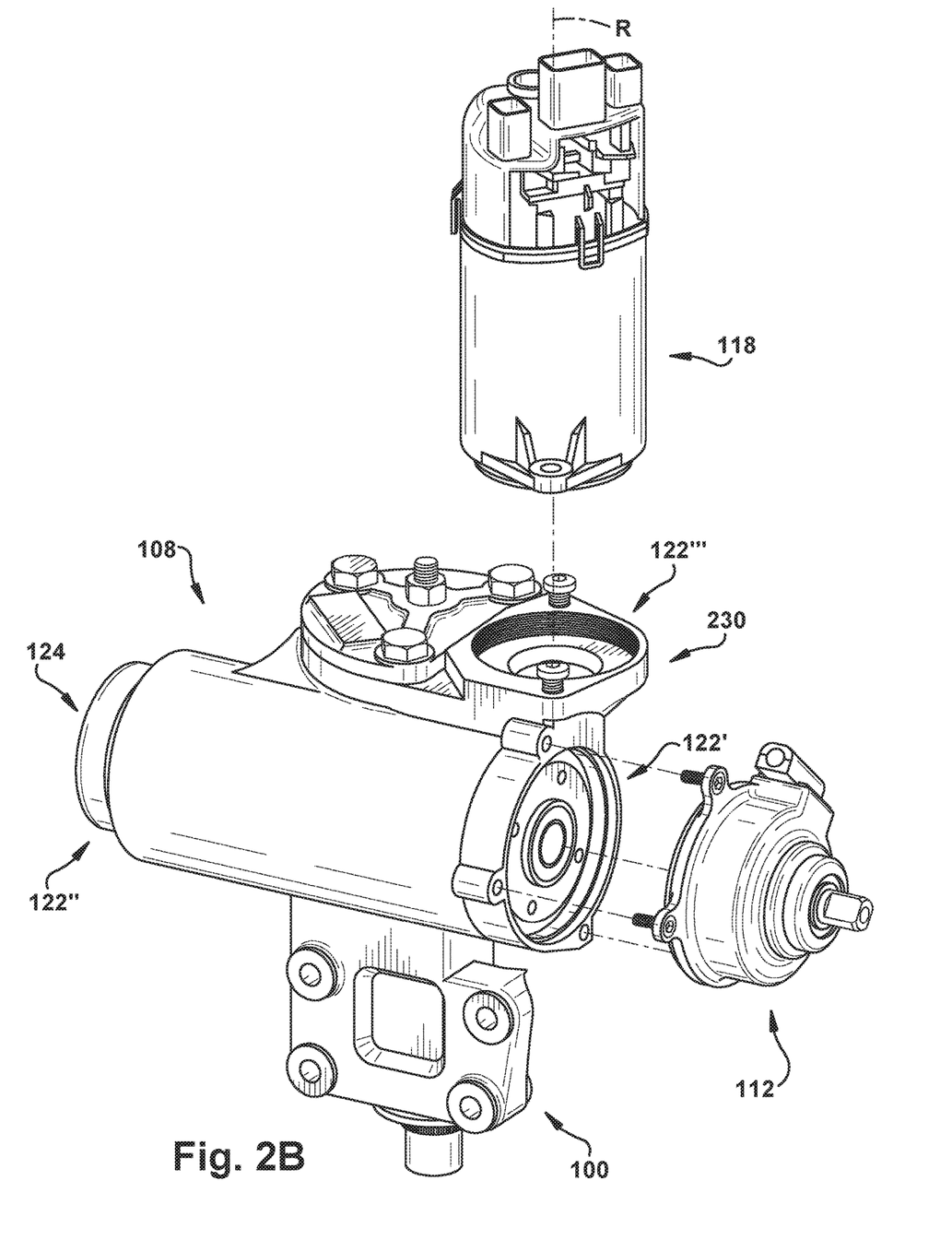
FIG. 2B is an exploded perspective side view corresponding to FIG. 2A.
Figure 2C:
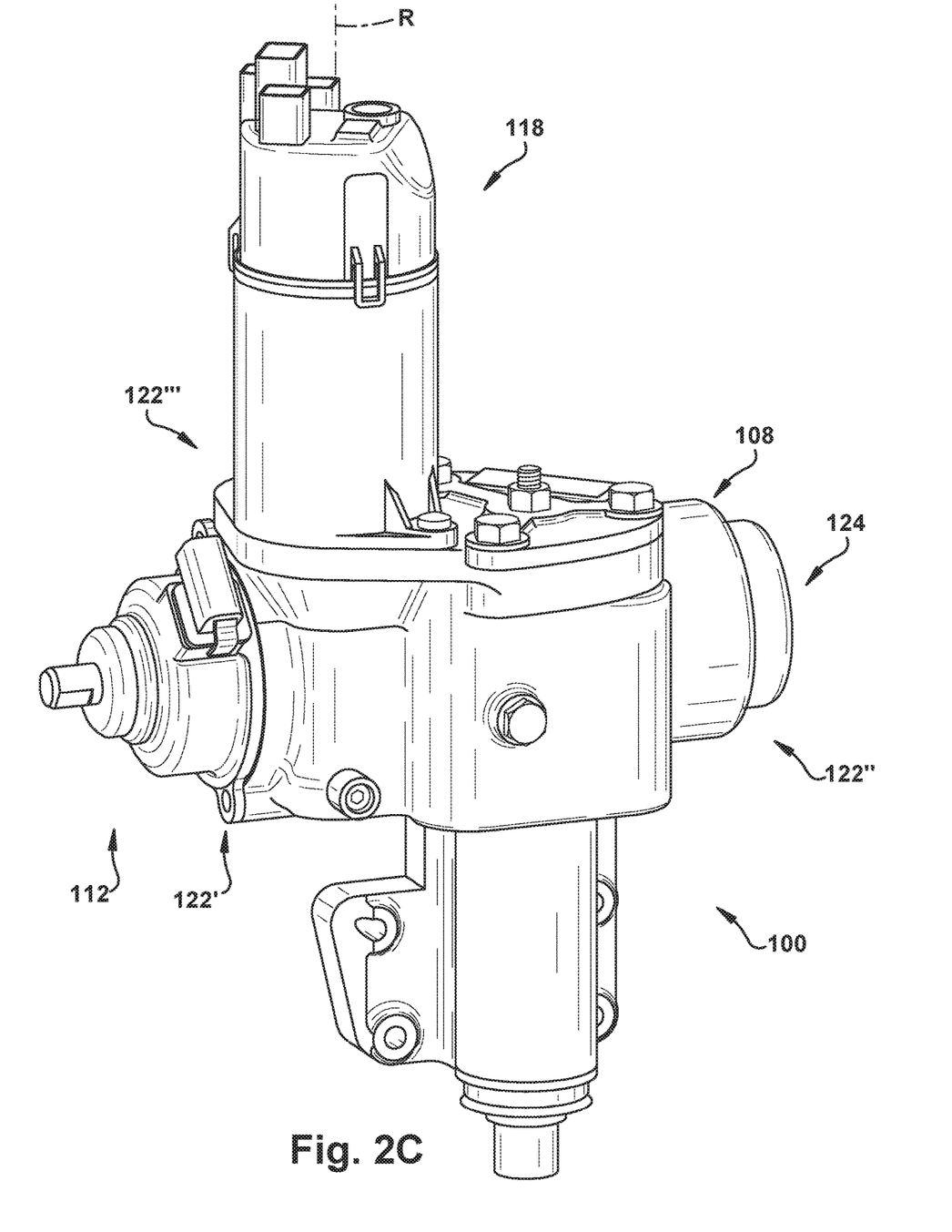
FIG. 2C is a perspective side view corresponding to FIG. 2A.

FIGS. 2A-2C depict an apparatus 100 including a transverse drive station 122'''. The transverse drive station 122''' includes a power input (shown as 230 in FIG. 2B) which is configured to accept rotational motive power from the first or second rotational input assembly 112 or 118. The rotational motive power is oriented around a rotational input assembly axis R, which is substantially perpendicular to the shaft axis S. The power input 230 may also or instead be configured to transfer the rotational motive power from the first or second rotational input assembly 112 or 118 to another drive station 122, such as, but not limited to, the first or second drive station 122' or 122". In FIGS. 2A-2C, the first rotational input assembly 112 is operatively connected to the first drive station 122', a removable cover 124 is "blocking off" the second drive station 122", and the second rotational input assembly 118 is operatively connected to the transverse drive station 122'''.

Figure 3:
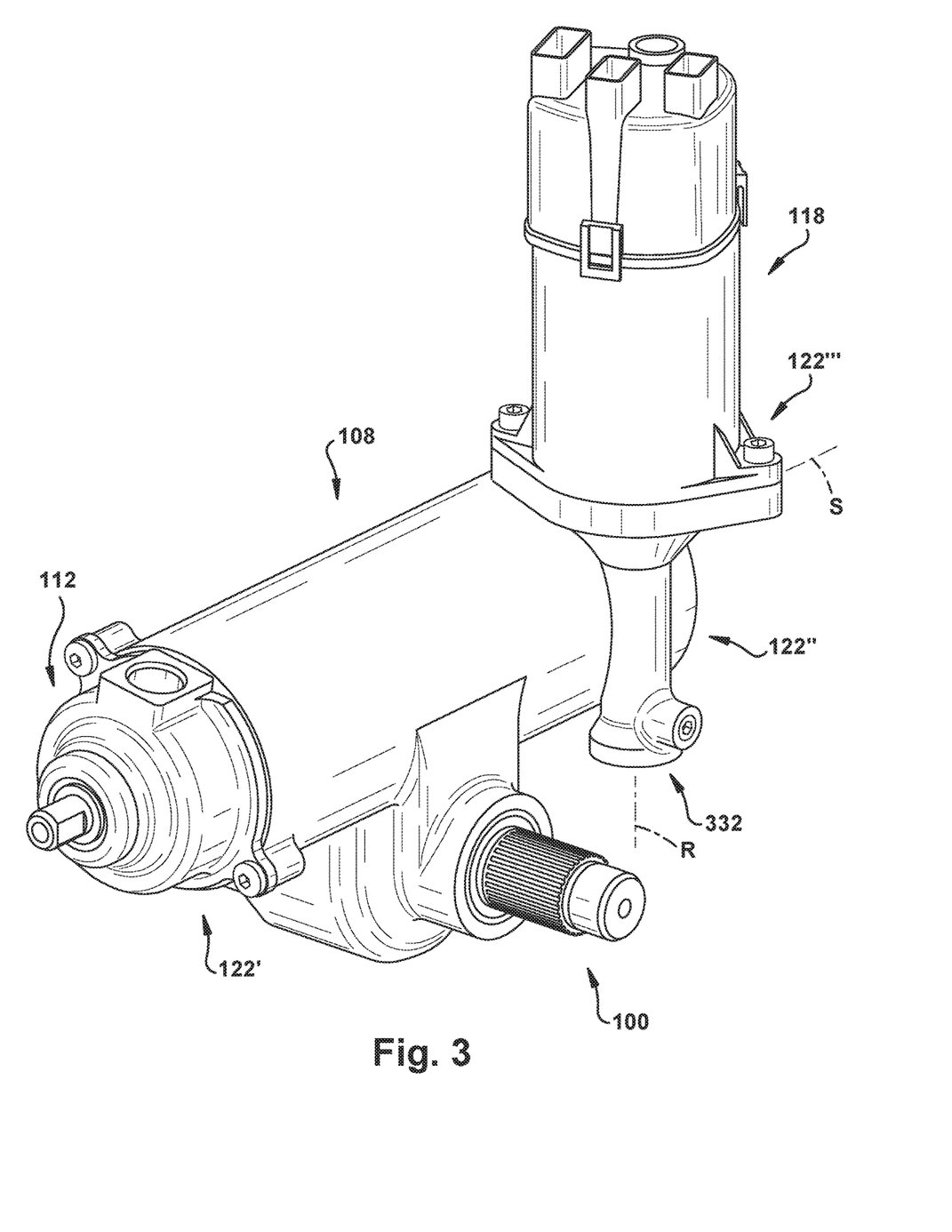
FIG. 3 is a perspective side view of the device of FIG. 1 in a second example use configuration.

FIG. 3 depicts another use configuration of the apparatus 100, wherein the transverse drive station 122''' is located toward the second end 128 of the rotatable shaft 102, in contrast to the more centrally-located transverse drive station 122''' of FIGS. 2A-2C. The transverse drive station 122''' of FIG. 3 includes a power redirecting module shown schematically at 332, and located inside a corresponding portion of housing 108. The power redirecting module 332 can include a gear train or otherwise be configured to mechanically redirect the accepted rotational motive power (along the rotational input assembly axis R) to an orientation around a direction parallel to the shaft axis S.

Figure 4A:
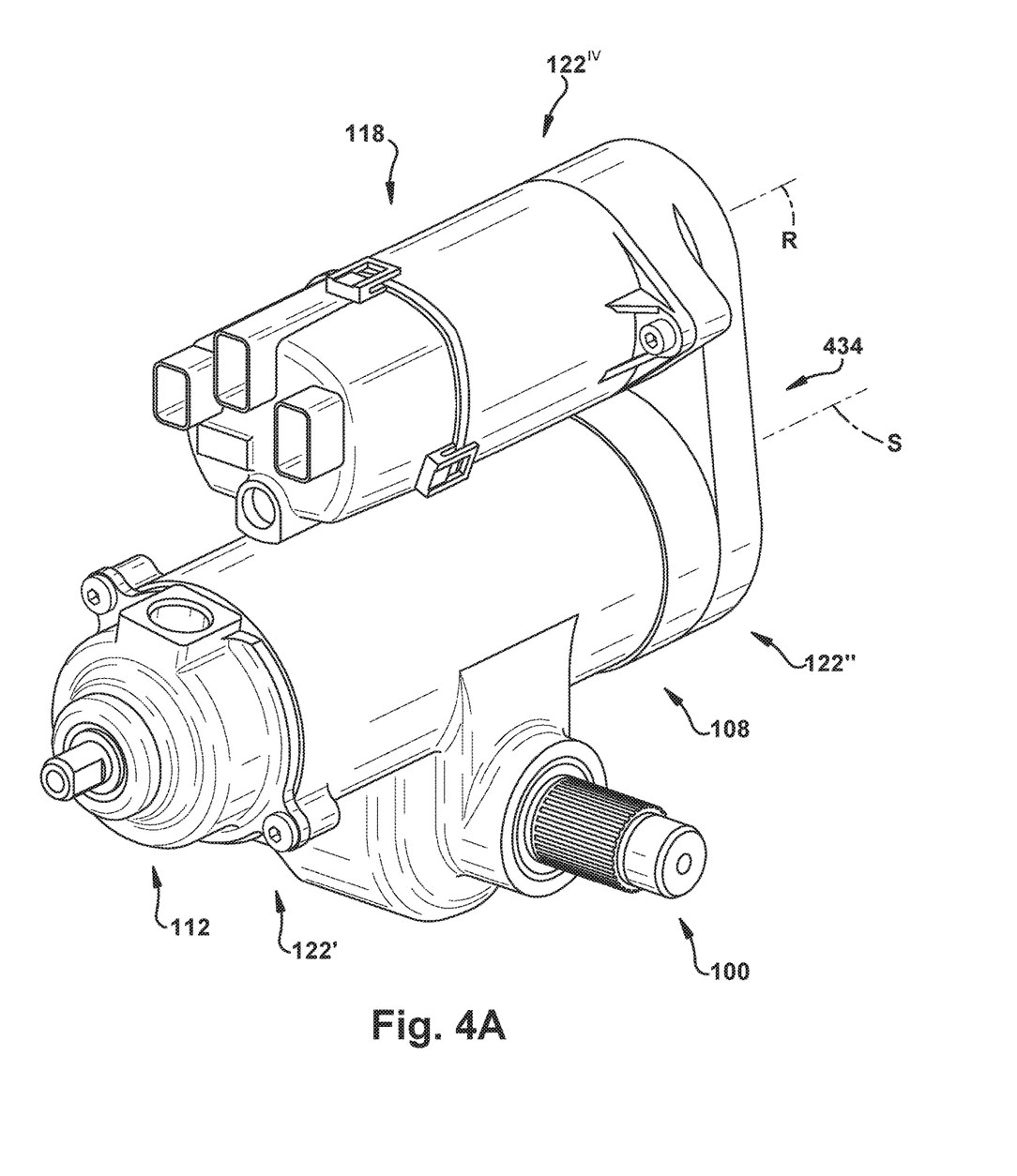
FIG. 4A is a perspective side view of the device of FIG. 1 in a third example use configuration.
Figure 4B:
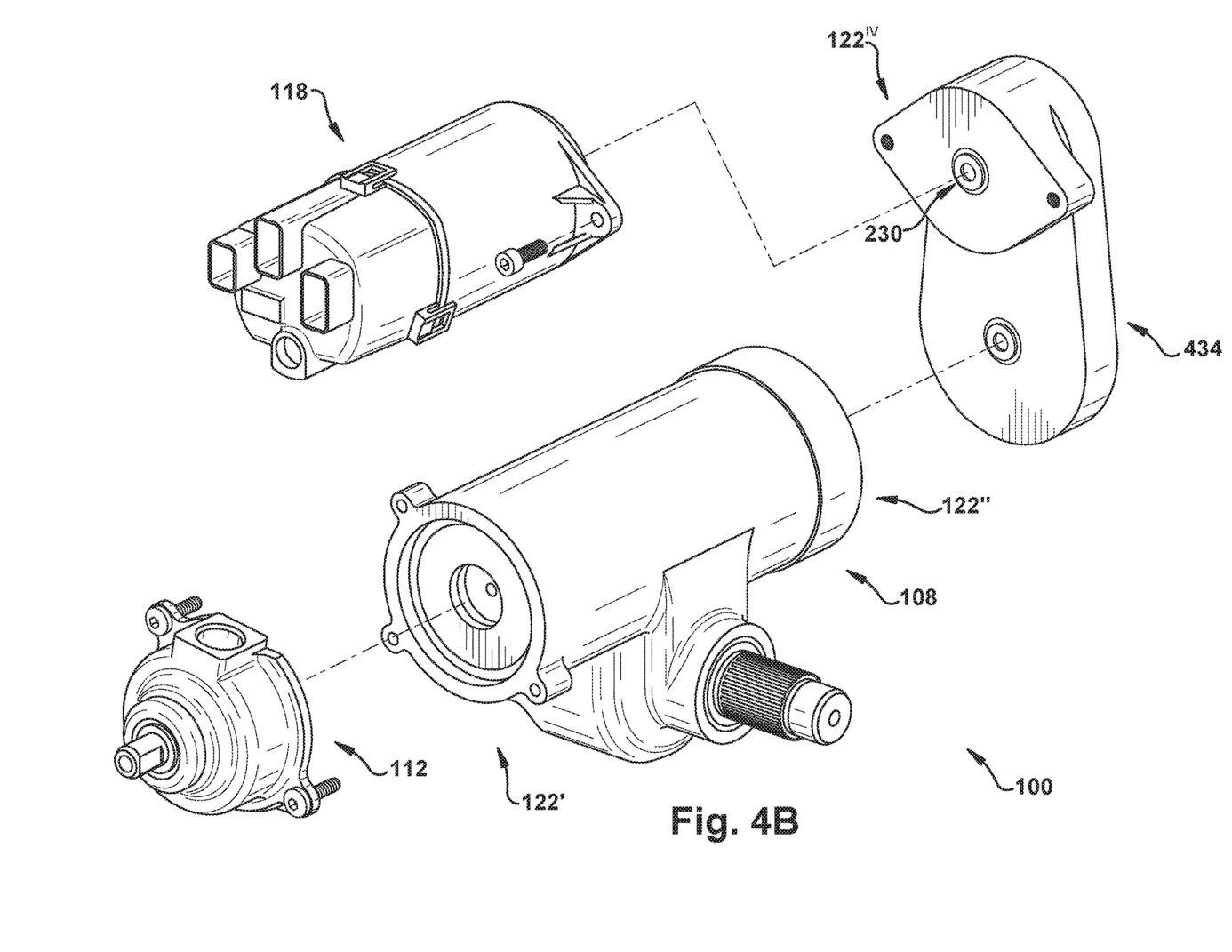
FIG. 4B is an exploded perspective side view corresponding to FIG. 4A.

FIGS. 4A-4B depict another use configuration of the apparatus 100, wherein a parallel drive station 122$^{iv}$ is spaced apart from the rotatable shaft 102 and includes a power transmitting module 434 configured to transmit the accepted rotational motive power to the first or second drive station 122' or 122". The parallel drive station 122$^{iv}$ could also or instead be a "freestanding" drive station which is spaced apart from the other drive station(s) of the apparatus 100.

As shown in FIGS. 4A-4B, the parallel drive station 122$^{iv}$ includes a power input 230 configured to accept rotational motive power from the first or second rotational input assembly 112 or 118, that rotational motive power being oriented around a rotational input assembly axis R which is substantially parallel to the shaft axis S. The power transmitting module 434 uses belt(s), gear(s), and/or any other desired mechanical components to shift and/or reorient (e.g., "U-turn", as shown in FIGS. 4A-4B) the rotational motive power from the first or second rotational input assembly 112 or 118 to the first or second drive station 122' or 122" and/or directly to the rotatable shaft 102.

The second rotational input assembly 118 is shown as associating with the parallel drive station 122$^{iv}$ in a "piggyback" or "twelve o'clock" rotational position on the top of the housing 108, in the orientation of FIGS. 4A-4B. It is contemplated, though, that the parallel drive station 122" could be oriented in any other rotational position (e.g., "three o'clock", "six o'clock", "nine o'clock", or any other desired parallel orientation to the rotational shaft 102), with accordingly configured power input 230 and power transmitting module 434 to reorient and/or shift the rotational motive power from the first or second rotational input assembly 112 or 118 as desired for a particular use environment.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A modular power steering apparatus, comprising:
   a rotatable shaft that is selectively rotatable to effect turning movement of at least one vehicle wheel;
   a housing supporting the rotatable shaft for rotation relative thereto, about a shaft axis;
   a first rotational input assembly for transmitting a steering command from a steering member to the rotatable shaft; and
   a second rotational input assembly operatively connected with the rotatable shaft, the second rotational input assembly being configured to apply a rotational force to the rotatable shaft;
   wherein the apparatus includes a plurality of drive stations, and each drive station is configured to selectively accept both of the first and second rotational input assemblies for operating connection to the rotatable shaft at different times.

2. The modular power steering apparatus of claim 1, wherein the housing includes a removable cover associated with at least one drive station, the cover being installed on a drive station which is not concurrently accepting the first or second rotational input assemblies.

3. The modular power steering apparatus of claim 1, wherein a first drive station is located coaxially along the shaft axis and directly adjacent a first end of the rotatable shaft.

4. The modular power steering apparatus of claim 3, wherein the first drive station includes at least one of an internal and external drive feature for operative connection to the first and/or second rotational input assemblies.

5. The modular power steering apparatus of claim 3, wherein a second drive station is located coaxially along the shaft axis and directly adjacent a second end of the rotatable shaft, oppositely facing and spaced apart from the first drive station.

6. The modular power steering apparatus of claim 5, wherein the first and second drive stations each include at least one of an internal and external drive feature for operative connection to the first and/or second rotational input assemblies.

7. The modular power steering apparatus of claim 1, wherein a parallel drive station is spaced apart from the rotatable shaft and includes a power input configured to accept rotational motive power from the first or second rotational input assembly oriented around a rotational input assembly axis substantially parallel to the shaft axis, the parallel drive station including a power transmitting module configured to transmit the accepted rotational motive power to the rotatable shaft.

8. The modular power steering apparatus of claim 7, wherein the power transmitting module is configured to transmit the accepted rotational motive power to the rotational shaft via the first or second drive station.

9. The modular power steering apparatus of claim 1, wherein a transverse drive station includes a power input configured to accept rotational motive power from the first or second rotational input assembly oriented around a rotational input assembly axis substantially perpendicular to the shaft axis.

10. The modular power steering apparatus of claim 9, wherein the transverse drive station includes a power redirecting module configured to mechanically redirect the accepted rotational motive power to an orientation around a direction parallel to the shaft axis.

11. The modular power steering apparatus of claim 1, wherein the first and second rotational input assemblies are configured for concurrent operative connection to different drive stations of the rotatable shaft.

12. The modular power steering apparatus of claim 1, wherein each drive station is located in at least one of a different orientation and a different position from the other drive stations relative to the rotatable shaft.

13. An apparatus for use in turning at least one vehicle wheel, the apparatus comprising:
   a rotatable shaft that is selectively rotatable to effect turning movement of the at least one vehicle wheel;
   a housing supporting the rotatable shaft for rotation relative thereto, about a shaft axis;
   a steering member for an operator to provide a steering command to the apparatus;
   a first rotational input assembly for transmitting the steering command from the steering member to the rotatable shaft;
   a second rotational input assembly operatively connected with the rotatable shaft, the second rotational input assembly being operable to apply a rotational force to the rotatable shaft; and
   wherein the apparatus includes a plurality of drive stations, and each drive station is configured to selectively accept both of the first and second rotational input assemblies for operating connection to the rotatable shaft at different times.

14. The apparatus of claim 13, wherein a first drive station is located coaxially along the shaft axis and directly adjacent a first end of the rotatable shaft.

15. The apparatus of claim 14, wherein the first drive station includes at least one of an internal and external drive feature for operative connection to the first and/or second rotational input assemblies.

16. The apparatus of claim 15, wherein a second drive station is located coaxially along the shaft axis and directly adjacent a second end of the rotatable shaft, oppositely facing and spaced apart from the first drive station.

17. The apparatus of claim 16, wherein the first and second drive stations each include at least one of an internal and external drive feature for operative connection to the first and/or second rotational input assemblies.

18. The apparatus of claim 13, wherein a parallel drive station is spaced apart from the rotatable shaft and includes a power input configured to accept rotational motive power from the first or second rotational input assembly oriented around a rotational input assembly axis substantially parallel to the shaft axis, the parallel drive station including a power transmitting module configured to transmit the accepted rotational motive power to the rotatable shaft.

19. The apparatus of claim 13, wherein a transverse drive station includes a power input configured to accept rotational motive power from the first or second rotational input assembly oriented around a rotational input assembly axis substantially perpendicular to the shaft axis.

20. The apparatus of claim 19, wherein the transverse drive station includes a power redirecting module configured to mechanically redirect the accepted rotational motive power to an orientation around a direction parallel to the shaft axis.

* * * * *